United States Patent [19]

Sterte

[11] Patent Number: 4,575,275

[45] Date of Patent: Mar. 11, 1986

[54] CLAMPING DEVICE FOR ATTACHING COMPONENT WHICH IS INSERTED INTO A HOLE

[76] Inventor: Ragnar Sterte, Boc 7008, S-550 07 Jönköping, Sweden

[21] Appl. No.: 610,988

[22] PCT Filed: Sep. 12, 1983

[86] PCT No.: PCT/SE83/00321
§ 371 Date: May 14, 1984
§ 102(e) Date: May 14, 1984

[87] PCT Pub. No.: WO84/01193
PCT Pub. Date: Mar. 29, 1984

[30] Foreign Application Priority Data

Sep. 13, 1982 [SE] Sweden ................................ 8205186

[51] Int. Cl.⁴ ........................... B25G 3/00; F16D 1/00
[52] U.S. Cl. ....................................... 403/7; 403/250; 108/156
[58] Field of Search .................. 403/290, 7, 409, 250; 108/156

[56] References Cited

U.S. PATENT DOCUMENTS

| | | | |
|---|---|---|---|
| 914,846 | 3/1909 | Jones | 403/250 |
| 3,491,706 | 1/1970 | Glass | 108/152 X |
| 3,787,132 | 1/1974 | Garnett | 403/290 |
| 4,190,375 | 2/1980 | Berry | 403/7 |
| 4,308,802 | 1/1982 | Munz | 108/156 |

FOREIGN PATENT DOCUMENTS 804879  2/1981  U.S.S.R. ................................ 403/409

*Primary Examiner*—Andrew V. Kundrat
*Attorney, Agent, or Firm*—Holman & Stern

[57] ABSTRACT

A clamping device with an improved attachment of a component (3) inserted in a hole (2) has a casing (5) of a deformable material arranged in a recess (4) in the end of the component and a V-shaped notch open towards the end of the component, a wedge (10) inserted in the notch with its longitudinal direction parallel to the end surface of the component, a screw (12) engaging in a threaded hole (11) through the wedge and extending through a hole (13) through the casing, the wedge being pressed down into the notch of the casing by the screw thereby displacing parts of the casing located around the notch towards parts of the component located on both sides of the recess (4) so that the latter parts are pressed towards the wall of the hole at right angles to the longitudinal direction of the wedge. By the arrangement according to the invention of the two holes (11, 13) through the wedge and the casing at an angle to the longitudinal direction of the wedge, tightening the screw will draw the wedge down into the notch and at the same time be displaced in its longitudinal direction with one end (17) against the wall in the hole (2), into which the component (3) is inserted in a direction perpendicular to the direction in which the wedge presses the parts of the component against the wall of the hole, which parts are located on both sides of the recess (4).

4 Claims, 4 Drawing Figures

CLAMPING DEVICE FOR ATTACHING COMPONENT WHICH IS INSERTED INTO A HOLE

BACKGROUND OF THE INVENTION

Field of the Invention

The present invention relates to a clamping device for the purpose of attaching a component, which is inserted into a hole, for example, a table leg, which is inserted with its upper end into a hole in a table frame or a table top.

BRIEF SUMMARY OF THE INVENTION

The clamping device is composed of a casing of a deformable material, for example plastics, inserted in a recess in the end of the component, the casing having a V-shaped notch open towards the end. Into this notch a wedge is inserted with its longitudinal direction parallel with the end surface of the component, and a screw is guided through a hole in the casing and screwed into a threaded hole through the wedge with its head adjoining an adjacent surface in the casing, so that, when tightening the screw, the wedge is pressed down into the notch of the casing by displacing parts of the casing on both sides of the notch against parts of the component on both sides of the recess thereby pressing the latter parts against the wall of the hole at right angles to the longitudinal direction of the wedge.

The object of the invention is to achieve a shaping of the clamping device in order to obtain pressure against the wall of the hole also at right angles to the last-mentioned pressure direction and thus an improved attachment of the component in the hole.

The invention will now be described in detail with reference to the accompanying drawings wherein.

DETAILED DESCRIPTION

Figure 4:
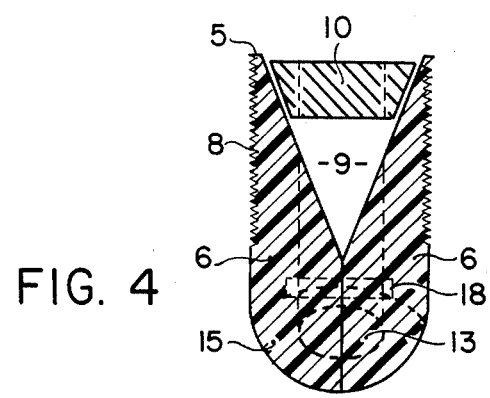
FIG. 4 is a view similar to FIG. 3 showing an alternative implementation of some details relating to the invention.
Figure 3:
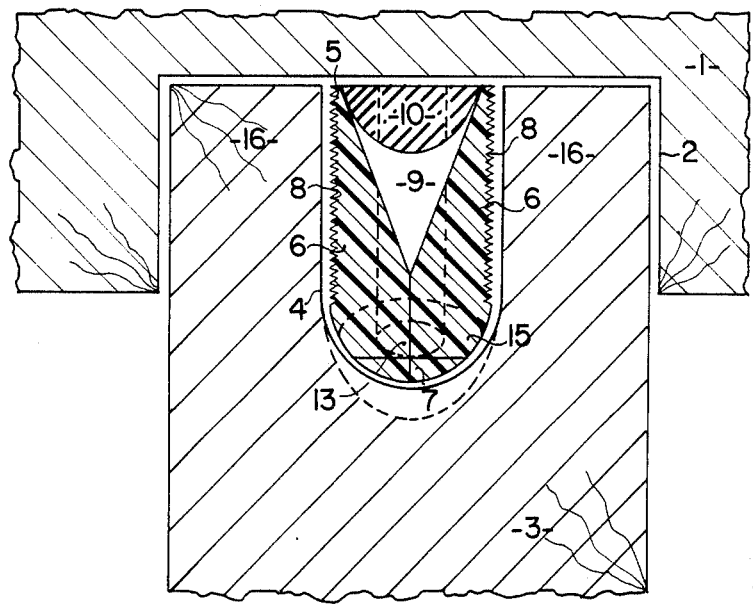
FIG. 3 is a cross-sectional view taken along the line B—B in FIG. 1 with the screw omitted.

In the drawing, 1 is part of a table frame or table top which on the underside has a hole 2 for a table leg 3 which is inserted into this hole at its upper end. The upper portion of the table leg has essentially in cross-section a U-shaped recess 4 into which a casing 5 is inserted. The casing, which is preferably manufactured of a deformable material such as nylon consists of two halves 6 which are connected to each other in the lower portions thereof by a relatively thin deformable wire 7. The outer walls 8 of the casing could, as shown in FIGS. 3 and 4, be knurled or serrated for a better grip against the walls of recess 4. In its upper portion the casing has a V-shaped notch 9, which is open toward the top. A wedge 10 with a preferably semi-cylindrical cross-section is inserted in the upper part of the notch. This wedge has a threaded hole 11 for a scew 12 to be screwed into the hole and guided through a corresponding hole 13 in the lower portion of the casing and the screw has a head 14 adjoining a contact surface 15 around the hole 13 in the lower portion of the casing.

According to the invention, the common axis of the holes 11 and 13 is arranged at an angle for example, 40° to 60°, to the longitudinal direction of the wedge 10.

Figure 1:
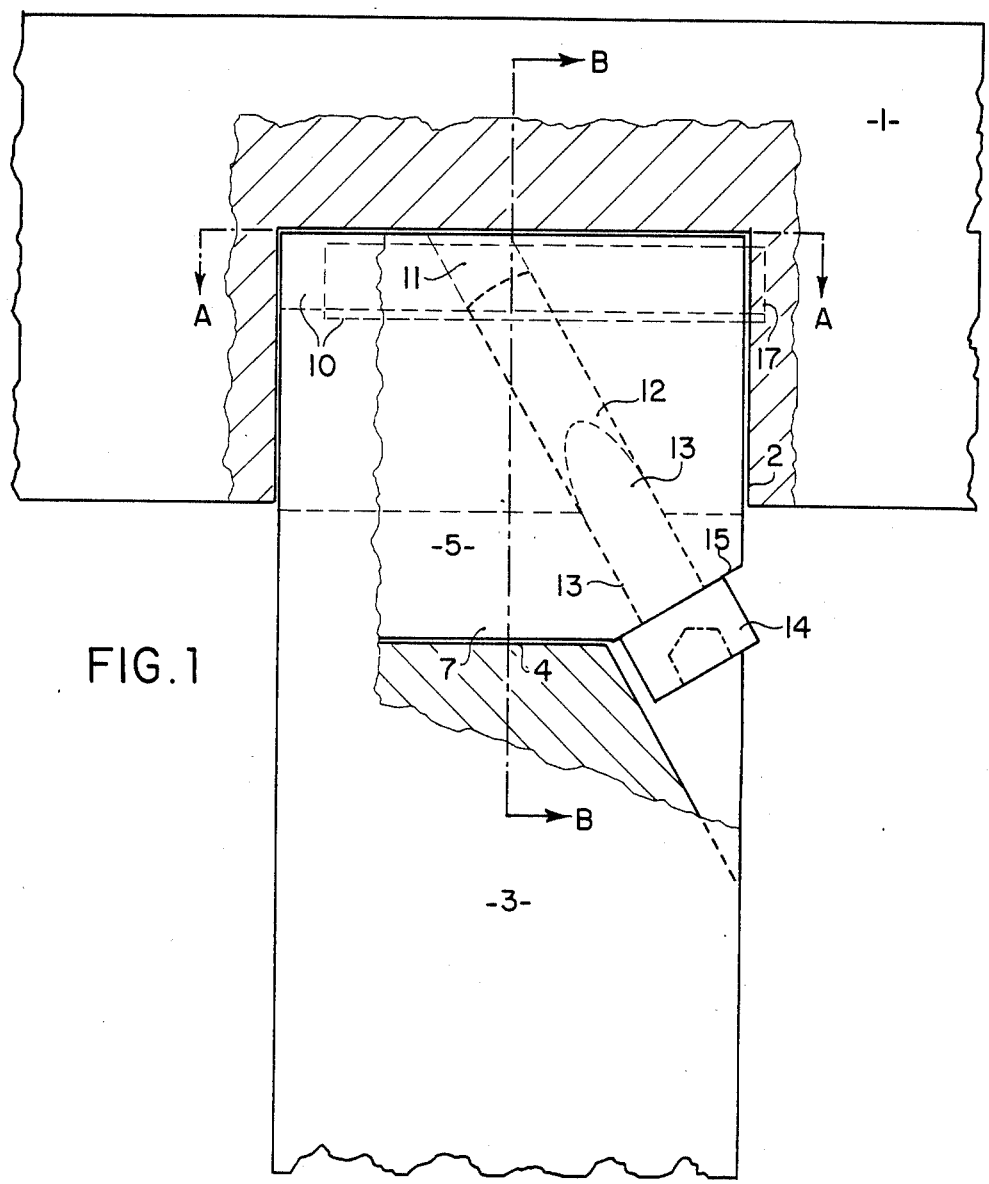
FIG. 1 is a view partly cut-away and cross in section, of part of a table frame or table top with an attached table leg, which is inserted with its upper end into a hole in said frame or top and attached by a clamping device according to the invention.

Tightening the screw 12 forces the wedge 10 some distance down between the sides of the casing between parts 6 which are located around the notch 3 and in this way these parts are pressed against the sides of the parts 16 which are located around the recess 4. These parts are pressed in this way against the wall of hole 2 in directions which are at right angles to the longitudinal direction of the wedge. At the same time, the angular force of the screw displaces the wedge somewhat in its longitudnal direction so that its one end 17 presses against the wall of the hole at that end as indicated in FIG. 1 with a broken line, which indicates the tightened location of the wedge. In this position with further tightening of the screw the wedge and screw in combination force the table leg in the opposite direction into contact with the wall of the hole at the opposite end of the wedge. The table legs thus are securely attached in two directions which are at right angles to each other.

If the screw is loosened the table leg can be removed from hole 2. A clamping device according to the invention may be modified as in FIG. 4 which shows that the wedge 9 can advantageously be shaped or constructed with a cross-section of trapezoidal shape.

Figure 2:
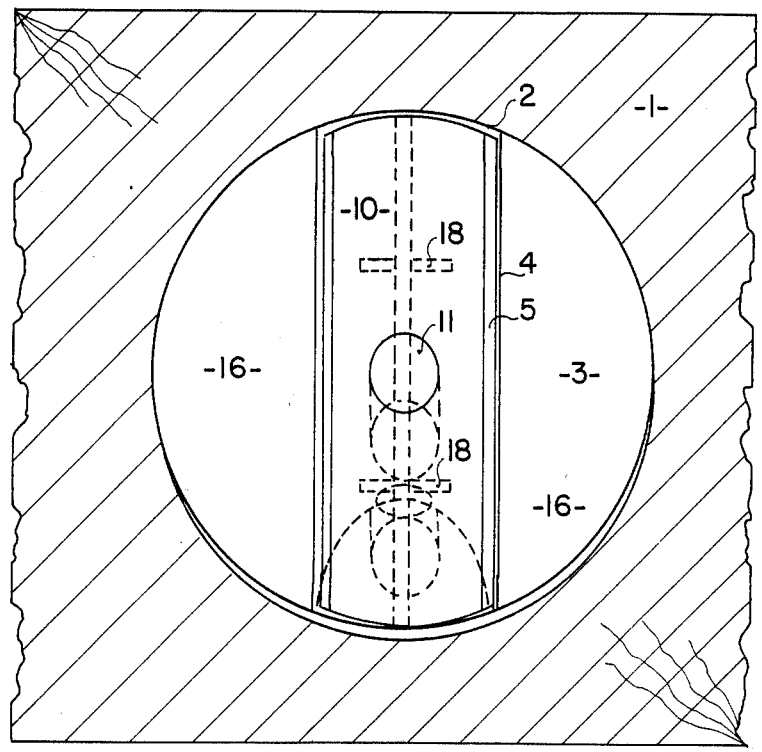
FIG. 2 is a cross-sectional view taken along the line A—A in FIG. 1 showing the upper end of the table leg with the screw omitted.

The thin wire 7 between the halves of the casing 6 may according to FIGS. 2 and 4 be replaced with pins 18 inserted in corresponding holes in the halves of the casing.

The clamping device according to the invention may be used in other areas than furniture construction.

I claim:

1. A clamping device for attaching a component inserted in a hole, such as a table leg inserted at its upper end in a hole in a table top or frame comprising:
    an elongated recess having a substantially U-shaped cross-section in the part of the component inserted into the hole;
    a deformable casing disposed in said recess;
    an elongated V-shaped notch in said casing having the open end of the V thereof facing the same direction as the open end of said U-shaped cross-section of said recess;
    an elongated wedge member in said notch having a longitudinal axis extending substantially parallel to the longitudinal axis of said recess;
    a screw-threaded hole in said wedge member on an axis at an acute angle to the longitudinal axis of said wedge member;
    a guide hole in said casing extending coaxially with said screw-threaded hole;
    a screw extending through said guide hole and threadedly engaging said screw-threaded hole; and
    a head on said screw engaging said casing on a contact surface thereof, so that when said screw is tightened said wedge member is drawn into said V-shaped notch to displace the portions of the casing on opposite sides of said notch outwardly transversely to the longitudinal axis of said wedge member into engagement with the sides of the U-shaped recess, and said wedge member is simultaneously displaced in its longitudinal direction into engagement with the side wall of the hole substantially perpendicularly to the direction of displacement of the portions of said casing.

2. A clamping device as claimed in claim 1 wherein:
said acute angle comprises an angle substantially between 40° and 60°;
the axis of said threaded hole is substantially coplanar with the longitudinal axis of said wedge member; and
said tightening of said screw further displaces the component oppositely to the direction of displacement of said wedge member into engagement with the side wall of the hole.

3. A clamping device as claimed in claim 2 wherein:
said U-shaped recess is disposed in the end of the component so that at least one part of the component on one side of the recess is resiliently displaceable at substantially right angles with respect to the longitudinal axis of said recess; and
said tightening of said screw causes said displaced portions of said casing to displace said at least one part of the component outwardly into engagement with the side wall of the hole.

4. A clamping device as claimed in claim 3 wherein:
said recess is disposed substantially centrally in the end of the component so that both parts on opposite sides of the recess are resiliently displaceable oppositely by said screw, wedge member and casing into engagement with the side wall of the hole.

* * * * *